(12) United States Patent
Merchant et al.

(10) Patent No.: US 8,359,463 B2
(45) Date of Patent: Jan. 22, 2013

(54) SELECTING A CONFIGURATION FOR AN APPLICATION

(75) Inventors: Arif A. Merchant, Los Altos, CA (US); Ludmila Cherkasova, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 437 days.

(21) Appl. No.: 12/788,013

(22) Filed: May 26, 2010

(65) Prior Publication Data

US 2011/0296249 A1    Dec. 1, 2011

(51) Int. Cl.
*G06F 1/24* (2006.01)

(52) U.S. Cl. ............ 713/100; 713/1; 714/3; 714/47.1; 717/120; 717/151

(58) Field of Classification Search .......... 713/1, 100; 714/3, 47.1; 717/120, 151
See application file for complete search history.

(56) References Cited

U.S. PATENT DOCUMENTS

| | | | |
|---|---|---|---|
| 6,154,769 A | 11/2000 | Cherkasova et al. | |
| 6,195,765 B1 * | 2/2001 | Kislanko et al. | 714/38.1 |
| 6,321,317 B1 | 11/2001 | Borowsky et al. | |
| 6,360,270 B1 | 3/2002 | Cherkasova et al. | |
| 6,366,931 B1 | 4/2002 | Borowsky et al. | |
| 6,425,057 B1 | 7/2002 | Cherkasova et al. | |
| 6,526,420 B2 | 2/2003 | Borowsky et al. | |
| 6,546,473 B2 | 4/2003 | Cherkasova et al. | |
| 6,606,585 B1 | 8/2003 | Borowsky et al. | |
| 6,681,309 B2 | 1/2004 | Szendy et al. | |
| 6,823,392 B2 | 11/2004 | Cherkasova et al. | |
| 6,865,601 B1 | 3/2005 | Cherkasova et al. | |
| 6,888,836 B1 | 5/2005 | Cherkasova et al. | |
| 6,922,752 B2 | 7/2005 | Uysal et al. | |
| 6,931,488 B2 * | 8/2005 | Paulraj | 711/118 |
| 7,032,086 B2 | 4/2006 | Merchant | |
| 7,035,971 B1 | 4/2006 | Merchant | |
| 7,036,008 B2 * | 4/2006 | Raghavachari et al. | 713/1 |
| 7,043,621 B2 | 5/2006 | Merchant et al. | |
| 7,050,956 B2 | 5/2006 | Uysal et al. | |
| 7,073,029 B2 | 7/2006 | Uysal et al. | |
| 7,117,242 B2 | 10/2006 | Cherkasova et al. | |
| 7,152,077 B2 | 12/2006 | Veitch et al. | |
| 7,174,334 B2 | 2/2007 | Cherkasova | |
| 7,200,598 B2 | 4/2007 | Cherkasova | |
| 7,225,118 B2 | 5/2007 | Wang et al. | |
| 7,228,381 B2 | 6/2007 | Uysal et al. | |
| 7,246,101 B2 | 7/2007 | Fu et al. | |

(Continued)

OTHER PUBLICATIONS

Mesnier, Michael et al., Relative fitness models for storage, Carnegie Mellon University, Pittsburgh, Pennsylvania, Undated, pp. 23-28.

(Continued)

*Primary Examiner* — Thuan Du

(57) ABSTRACT

There is provided a computer-implemented method for selecting from a plurality of full configurations of a storage system an operational configuration for executing an application. An exemplary method comprises obtaining application performance data for the application on each of a plurality of test configurations. The exemplary method also comprises obtaining benchmark performance data with respect to execution of a benchmark on the plurality of full configurations, one or more degraded configurations of the full configurations and the plurality of test configurations. The exemplary method additionally comprises estimating a metric for executing the application on each of the plurality of full configurations based on the application performance data and the benchmark performance data. The operational configuration may be selected from among the plurality full configurations based on the metric.

20 Claims, 3 Drawing Sheets

U.S. PATENT DOCUMENTS

| | | | |
|---|---|---|---|
| 7,266,716 B2 | 9/2007 | Frolund et al. | |
| 7,284,088 B2 | 10/2007 | Frolund et al. | |
| 7,310,681 B2 | 12/2007 | Cherkasova et al. | |
| 7,310,703 B2 | 12/2007 | Frolund et al. | |
| 7,349,906 B2 | 3/2008 | Cherkasova | |
| 7,376,741 B1 | 5/2008 | Carter et al. | |
| 7,424,528 B2 | 9/2008 | Cherkasova et al. | |
| 7,426,616 B2 | 9/2008 | Keeton et al. | |
| 7,437,451 B2 | 10/2008 | Tang et al. | |
| 7,454,424 B2 | 11/2008 | Cherkasova | |
| 7,467,329 B1 | 12/2008 | Keeton et al. | |
| 7,467,333 B2 | 12/2008 | Keeton et al. | |
| 7,487,508 B2 | 2/2009 | Fu et al. | |
| 7,512,701 B2 | 3/2009 | Cherkasova | |
| 7,523,217 B2 | 4/2009 | Cherkasova | |
| 7,536,585 B1 | 5/2009 | Keeton et al. | |
| 7,609,703 B2 | 10/2009 | Shah et al. | |
| 7,610,381 B2 | 10/2009 | Cherkasova et al. | |
| 7,613,818 B2 | 11/2009 | Cherkasova et al. | |
| 7,643,983 B2 | 1/2010 | Lumb et al. | |
| 7,644,046 B1 | 1/2010 | Keeton et al. | |
| 7,644,249 B2 | 1/2010 | Keeton et al. | |
| 7,647,454 B2 | 1/2010 | Aguilera et al. | |
| 7,680,635 B2 | 3/2010 | Keeton et al. | |
| 7,689,710 B2 | 3/2010 | Tang et al. | |
| 7,716,425 B1 | 5/2010 | Uysal et al. | |
| 7,725,655 B2 | 5/2010 | Frolund et al. | |
| 8,140,682 B2 * | 3/2012 | Murthy et al. | 709/226 |
| 2009/0241104 A1 * | 9/2009 | Amiga et al. | 717/174 |
| 2011/0197046 A1 * | 8/2011 | Chiu et al. | 711/171 |

OTHER PUBLICATIONS

Mesnier, Michael et al., Modeling the Relative Fitness of Storage, Carnegie Mellon University, Pittsburgh, Pennsylvania, Copyright 2007, Sigmetrics 2007.

* cited by examiner

100

200

400

SELECTING A CONFIGURATION FOR AN APPLICATION

BACKGROUND

A business datacenter may include large numbers of computing resources and storage resources. Examples of computing resources include servers, workstations, desktop computers and the like. Storage resources may include multiple disk arrays, network-attached storage (NAS) devices, direct storage and the like.

Large scalable storage systems frequently include massive amounts of local and remote storage and are intended to support complex applications that may require predetermined levels of performance and/or dependability. Such desired service requirements may be expressed in terms of a service level objective. A service level objective typically states a desired combination of performance and dependability characteristics that a user desires for a given application. When agreeing to provide particular levels of service, a datacenter may sell services according to a service level agreement that mirrors the performance and dependability characteristics agreed to by the user. If the agreed-upon service level is not met over a period of time, a financial penalty may be imposed on the datacenter.

The storage resources of a datacenter may be configured in a large number of ways, any one of which may meet a particular agreed-upon service level. Each of these configurations has an associated cost and probability of failure with respect to providing the agreed-upon service level over time. Selecting an optimal configuration that meets the agreed-upon service level while optimizing cost for the datacenter is a challenging problem.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1:
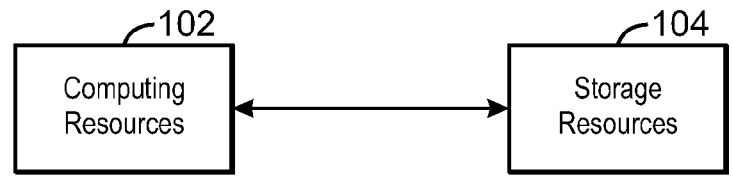
FIG. 1 is a block diagram of an enterprise storage system, in accordance with exemplary embodiments of the present invention.

Exemplary embodiments of the present invention relate to providing an estimate of a probability that a given configuration of storage resources will meet given requirements for performance and dependability. In one exemplary embodiment, estimates of occurrence of failure scenarios of various storage components in a configuration are employed in combination with estimates of the system's performance in the failure scenarios to obtain insight into a performance and dependability profile of individual configurations. Moreover, this insight allows a datacenter to decide whether a particular configuration is likely to fulfill an agreed-upon service level for running a specific application, and doing so at an acceptable cost.

As used herein, the term "performability" relates to combined aspects of performance and dependability characteristics of a storage system. Performability may be expressed in one or more metrics that provide a measure of how well the system performs in the presence of failures of system components over some time interval. Moreover, performability may comprise a combination of performance, reliability, availability, and cost metrics appropriate for a particular application. Examples of performability metrics include the capability to retrieve an object in a specific amount of time a certain percentage of the time or the capability to handle a certain number of user accesses at once. Typically, it is hard to measure availability of a configuration by direct measurement, since it depends on failures, which are relatively rare events. It is more practical to measure other components of performability, such as the performance, by direct measurement, but to estimate the availability portion using separate mathematical models. These models may, however, contain parameters that are separately determined by direct measurement. For example, a large configuration may have thousands of disks, and the failure rate of each kind of disk used may have been separately determined by measurements (performed either by the user or by the disk manufacturer). Thus, performance characteristics may be measured. Dependability characteristics may be either measured or estimated through models. Performability can be estimated by combining the two together.

As used herein, a full configuration is an arrangement of storage resources that is selected to meet all requirements necessary to provide a desired service level when running an application. Performability characteristics of a given full configuration are related to configuration options selected by a customer who desires to run an application in a datacenter. As will be explained, a large number of full configurations potentially exist for a given application, attributable in part to a relatively large number of user-selectable performability characteristics in a typical datacenter. Moreover, a large number of full configurations of storage resources may be capable of providing the service level corresponding to a user's selection of configuration options.

In deciding which full configuration of storage resources to use for a particular application, it is not feasible to test a large number of full configurations directly. Without the practical ability to test a large number of full configurations, system designers and service providers may rely on models of various candidate configurations, including configurations in which failures of certain components are assumed, to provide estimates of performability for a large number of full configurations. An optimal full configuration may be chosen for the application based on these estimates.

To provide performability estimates according to the present invention, an application may be run on a relatively small number of test configurations relative to a number of potential full configurations of a storage system. Past measurements (for example, benchmark data) of other applications on both the test configurations and a number of full configurations may be used to estimate how a particular application will perform on the full configurations. The estimate of performability may be used to select a full configuration for executing the application. Moreover, an exemplary embodiment enhances the selection of a full configuration that is likely to provide an agreed-upon service level at an optimum cost.

FIG. 1 is a block diagram of a datacenter, in accordance with exemplary embodiments of the present invention. The datacenter is referred to by the reference number 100. The datacenter 100 includes computing resources 102, which may include one or more servers, desktop computers or the like. The computing resources 102 are connected to one or more storage resources 104. The storage resources may include disk drives arranged as virtual drives, storage pools or the like. The storage resources 104 may be organized as a large scalable storage system, with a large number of individual components. Moreover, the storage resources 104 may be disposed locally or remotely (or some combination of the two) relative to the computing resources 102.

In a typical datacenter, customers provide a service level objective for their applications. A service level objective corresponds to a desired level of performability when the datacenter is running the application. The datacenter may enter into an agreement known as a service level agreement, in which the datacenter agrees to provide a specific service level for the application. The specific level of service may be measured by one or more performability metrics. One or more system administrators may allocate the computing resources 102 and the storage resources 104 to provide the necessary service level to accommodate the customers applications. As explained herein, an exemplary embodiment of the present invention relates to selecting a full configuration of the storage resources 104 to optimize the cost of running a given application while meeting the specific service level agreement for the application.

One example of a large-scale application that may be executed in the datacenter 100 is a Key-Binary Large Object (Blob) Archive developed by Hewlett-Packard Company. The Key-Blob Archive employs tags or keys that are used to access large unitary blocks of data known as blobs. As one example, a photo sharing website may use a Key-Blob Archive to allow users to access one or more photos, which are transmitted as un-editable blobs when accessed with a corresponding tag.

Configuration options for such a Key-Blob Archive system may correspond to performability metrics, which in turn relate to specific levels of service that may be desired by a customer hiring the datacenter 100 to host an application that makes use of the Key-Blob Archive system. In one exemplary embodiment, configuration options include a choice of a number of separate copies or fragments into which a data object is split, a number of parities fragments stored at a local datacenter, a number of additional parity fragments stored at a remote datacenter, and/or a number of parities to be written before a data write is considered complete, to name just a few examples.

Configuration options may be designed to allow an owner of the application to choose a desired level of performability for the application. The selection of configuration options may result in tradeoffs between conflicting performability metrics. For example, selecting configuration options that provide rapid response time (low latency) may result in a lower degree of data dependability.

As explained herein, it is likely that a large number of full configurations of the storage resources 104 may be capable of providing the service level desired by the owner of an application. While the cost of a specific configuration can be computed directly, predicting the long-term ability of a configuration to meet an agreed-upon service level may be difficult.

Figure 2:
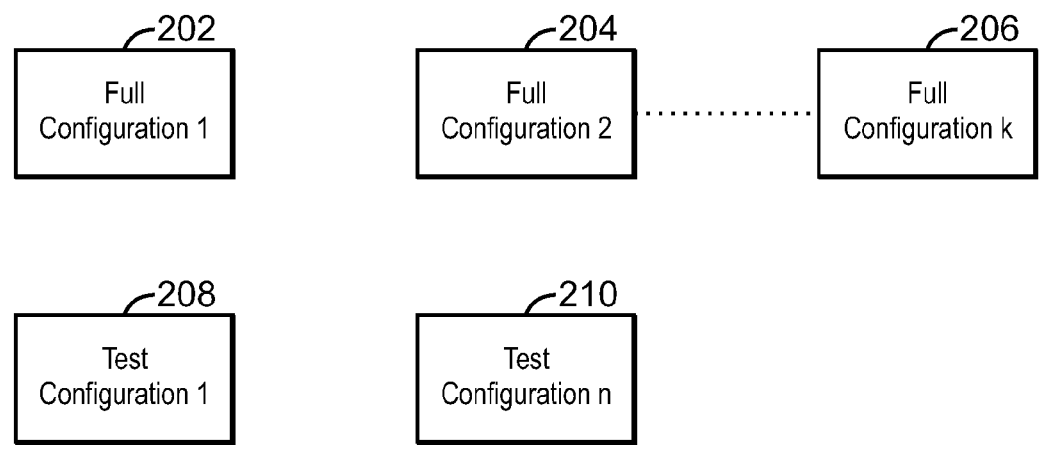
FIG. 2 is a block diagram that is useful in explaining the selection of an optimal full configuration of storage resources, in accordance with an exemplary embodiment of the present invention.

FIG. 2 is a block diagram that is useful in explaining the selection of an optimal full configuration of the storage resources 104, in accordance with an exemplary embodiment of the present invention. The diagram is generally referred to by the reference number 200. The diagram 200 includes a first full configuration 202, a second full configuration 204 and a kth full configuration 206. As set forth herein, the full configurations 202, 204, 206 comprise arrangements of the storage resources 104 that meet all performability characteristics needed to provide a given level of service when running an application. The full configurations 202, 204, 206 are typically implemented in a datacenter using a relatively large amount of effort and expense.

When determining whether a particular one of the full configurations 202, 204, 206 may provide a desired service level for an application over time, it is desirable to take into consideration potential failures of individual components that comprise the storage resources 104 and are used to implement the particular full configuration. Moreover, a series of full configurations may be contemplated, each of which takes into account a failure (for example, unavailability) of one or more components of the storage resources 104. Each of the configurations that have a failure mode may be referred to herein as a "degraded configuration." A probability may be assigned with respect to the occurrence of each degraded configuration. For example, a Markov model may be used to provide probabilistic estimates of the likelihood of occurrence for each degraded configuration. As explained herein, probability values for degraded configurations may be used in part to make a determination of whether a particular initial full configuration is likely to provide a specific service level over time.

As explained herein it is typically not practical to test an application on a large number of full configurations to determine an optimum full configuration to meet performability metrics for an application. This is normally true because of the relative complexity and expense of implementing the full configurations and subsequently evaluating the application on each one. In addition, it is further unlikely that the application could be tested on each degraded configuration (or even the degraded configurations most likely to occur) in order to get an accurate estimate of system performability for the specific application. Instead, exemplary embodiments of the present invention provide for running an application on a plurality of test configurations.

The diagram 200 shows a first test configuration 208 and an nth test configuration 210. There is typical a much smaller number of test configurations relative to the number of full configurations. In addition, the test configurations 208, 210 are typically implemented using significantly less effort and expense relative to the full configurations 202, 204, 206. In an exemplary embodiment, the test configurations may comprise full configurations, degraded configurations or other configurations. It is desirable for test configurations to cover as wide a variety of possibilities as practical. For example, in the Key-Blob Archive example, some test configurations may be purely local (i.e., one data center only). In addition, some test configurations may span data centers, some may be focused on providing fast response, and some may be focused on providing high dependability.

The test configurations 208, 210 used to provide estimates of performability of an application according to an exemplary embodiment are desirably chosen to allow good estimates of performability on the different available full configurations and one or more degraded configurations over time. Once the performability and cost characteristics of each full configuration and degraded configuration are estimated, a datacenter user can select the most desirable full configuration on which to run the application while meeting performability criteria desired by a customer.

In general, the set of full configurations of the storage resources 104 that may be used to run applications in compliance with desired performability levels is large, but nonetheless limited in size. In selecting a full configuration for a given application it may be desirable to consider the configurations that are feasible, and most likely to be used. Many possible full configurations are not feasible. For example, configurations that are obviously too expensive, or obviously too poorly performing (based on models or past experience), or too undependable (again, based on models or experience) are not good candidates. On the other hand, configurations that have been successfully used in the past for similar applications, or are scaled versions of such configurations, may be of interest. In general, both theory (models) and past experience may be used to limit the set of full configurations that need to be considered, since the complete set of possible configurations is exponentially large.

In one exemplary system, there are about n=1,000 potential full configurations that meet a desired service level for a given application. Let the kth full configuration be denoted as $I_{k,0}$. The potential full configurations may include configurations with different numbers of datacenters, different parity layouts, and consistency characteristics, to name just a few examples. Moreover, a different full configuration is obtained by changing any one of the configuration variables.

In an exemplary embodiment, it may be assumed that likely degraded configurations of each full configuration and their probabilities of occurrence can be computed. For purposes of explanation, assume that the degraded configurations of full configuration $I_{k,0}$, are denoted $I_{k,1}, I_{k,2}, \ldots$, and the probability of occurrence corresponding to $I_{k,I}$ is $P_{k,I}$. For example, given the components of the system and their individual failure rates, the probabilities of occurrence for each degraded mode can be computed using known methods such as a Markov model. Alternatively, failure probabilities can also be computed using a computer simulation designed for that purpose or from actual experience. These alternative methods, however, may tend to be of limited use with large configurations and rare failure modes.

Furthermore, an assumption may be made that a finite subset of potential full configurations are actually available for application testing. This subset may typically be much smaller than the set of potential full configurations. For purposes of example, the number of potential full configurations may be much larger (about 100 times greater) than the number of test configurations. In the example discussed herein, this would lead to a subset of the potential full configurations that are practically testable of m=10 test configurations. The kth full test configuration may be denoted $T_k$. The test configurations are desirably maintained so that they are always available for evaluating new applications to be ran in the datacenter.

In addition, assume the availability of a set of p representative benchmark test programs, denoted $B_1, B_2, \ldots, B_p$. The benchmarks may include synthetic benchmarks (that is, workloads generated by programs designed to generate I/Os for testing) and real applications. The benchmarks desirably have adequate coverage of the space of applications that may be run in the datacenter 100. As used herein, adequate coverage means that the benchmarks collectively demonstrate behaviors representative of all applications that may be run in the datacenter 100.

Synthetic benchmarks can be used to ensure such coverage. For example, in a Key-Blob Archive system, the benchmarks may exercise the full range of all the workload parameters such as the object size, get/put ratio, frequency of overwrites, temporal locality (how often a recently read/written object is accessed again), and how frequently a read access to non-existent keys is made, to name just a few examples.

In an exemplary embodiment of the present invention, the benchmarks are run on all potential full configurations of the storage resources 104. In addition, each benchmark may be run on a group of degraded configurations, which may be simulated by temporarily disabling individual components of the storage resources 104. The group of degraded configurations may comprise all known degraded configurations.

The benchmarks may also be run on the test configurations 208, 210. In each case, performance statistics (for example, the latency and throughput of the application) are collected, as well as the system load characteristics. The set of measurements using benchmark $B_i$ on configuration C is represented by the vector $M(C, B_i)$. C could be one of the initial potential full configurations, a degraded configuration, or a test configuration.

Using these measurements, a model $f_{i,j}$ may be estimated, as follows:

$$M(I_{i,j},B)=f_{i,j}(M(T_1,B), M(T_2,B), \ldots, M(T_m,B))$$

to fit the measured values for $B=B_1, B=B_2, \ldots, B=B_p$.

The function $f_{i,j}$ can be estimated using known non-linear modeling methods. Another approach is to use a linear model:

$$M(I_{i,j},B)=f_{i,j}(M(T_1,B), M(T_2,B), \ldots, M(T_m,B))=A_{i,j,1}M(T_1,B)+A_{i,j,2}M(T_2,B)+ \ldots +A_{i,j,m}M(T_m,B).$$

The A matrices can be estimated using linear regression.

Functions may be created to provide estimates of performance metrics for all potential full configurations and their degraded configurations. Once the functions $f_{i,j}$ are known, the performance of an application X on a configuration $I_{i,j}$ may be computed (including degraded configurations) as $\tilde{M}(T_{i,j}, X)=f_{i,j}(M(T_1, X), M(T_2, X), \ldots, M(T_m, X))$, by measuring the performance and characteristics of application X on the test configurations $T_1, T_2, \ldots, T_m$ only. Previously obtained data from the benchmarking process may be used to relate the specific application data from the test configurations to all of the potential configurations and their degraded configurations.

In one exemplary embodiment, the combined performability characteristics of each potential full configuration and the corresponding degraded configurations can be computed from the probabilities $P_{i,j}$ and the estimated performance vector $\tilde{M}(T_{i,j},X)$. For example, suppose the criterion one wants to use for an acceptable configuration is that the throughput is at least 1,000 object gets per second for 99.99% of the time. This can be checked for each configuration by adding the probabilities of the modes (normal configuration and degraded configurations) where the throughput is at least 1,000 object gets per second, as determined from the performance estimation $\tilde{M}$ and verifying that the combined probability exceeds 0.9999.

Thus, the performability characteristics of the available full configurations for the application X may be estimated based on data previously obtained through benchmark testing. In this manner, a datacenter operator may choose an optimal full configuration on which to run an application. The optimal full configuration may be chosen so that performability metrics of a service level agreement with the customer is met while minimizing cost to the datacenter.

Figure 3:
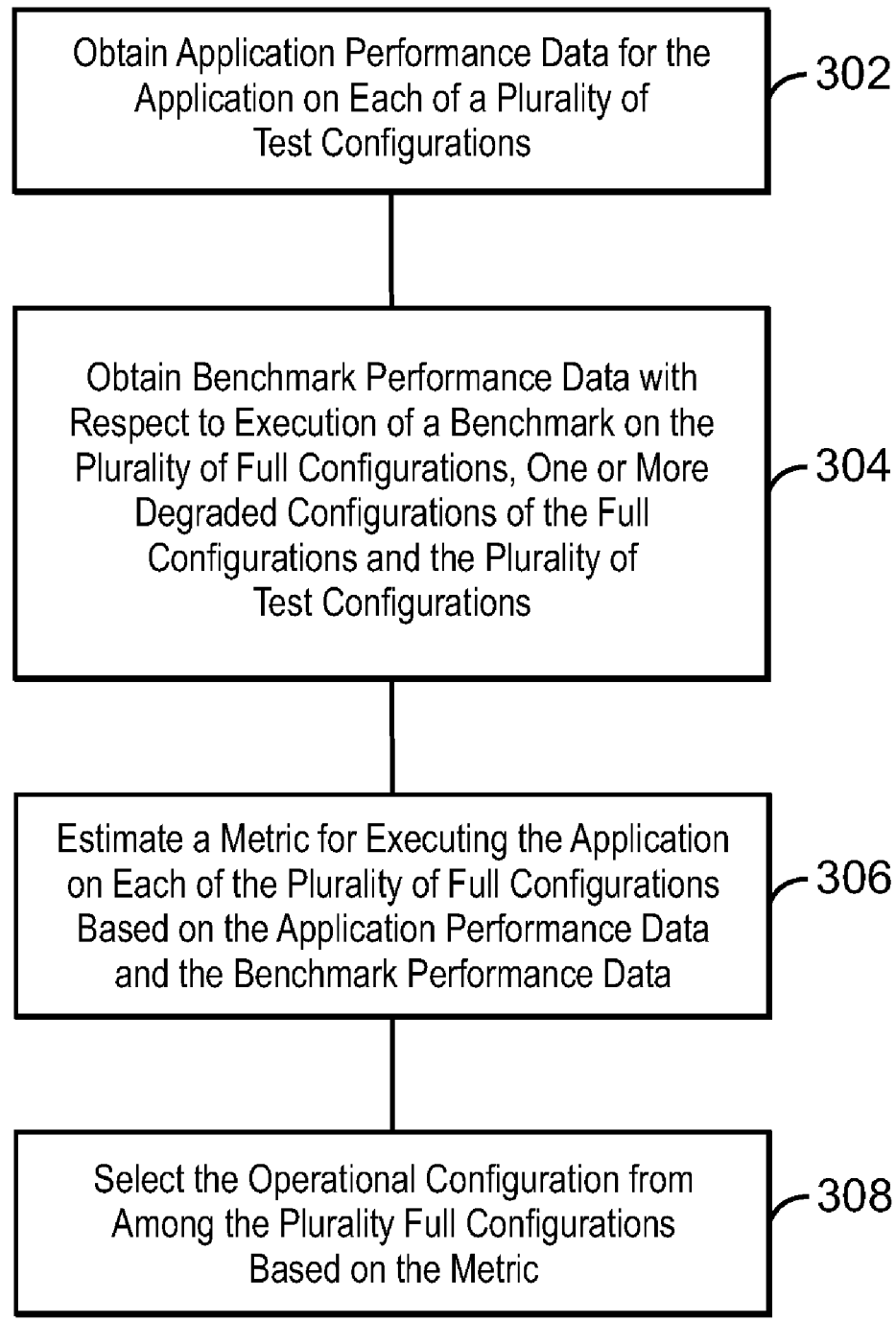
FIG. 3 is a process flow diagram of a method for selecting a full configuration of storage resources for an application in accordance with an exemplary embodiment of the present invention.

FIG. 3 is a process flow diagram of a method for selecting a full configuration of storage resources for an application in accordance with an exemplary embodiment of the present invention. The method is generally referred to by the reference number 300.

In particular, the method 300 is a computer-implemented method for selecting from a plurality of full configurations of a storage system an operational configuration for executing an application. The method begins at block 302, where performance data for the application on each of a plurality of test configurations is obtained. At block 304, benchmark performance data is obtained. In an exemplary embodiment, the benchmark performance data relates to execution of a benchmark on the plurality of full configurations, one or more degraded configurations of the full configurations and the plurality of test configurations.

A metric for executing the application on each of the plurality of full configurations is estimated based on the application performance data and the benchmark performance data, as shown at block 306. At block 308, the operational configuration from among the plurality of full configurations is selected based on the metric. As explained herein, the metric may relate to the performability of the application on a full configuration. Exemplary embodiments of the invention facilitate selection of the operational configuration so that an agreed-upon service level may be achieved while optimizing the cost of providing the service level.

Figure 4:
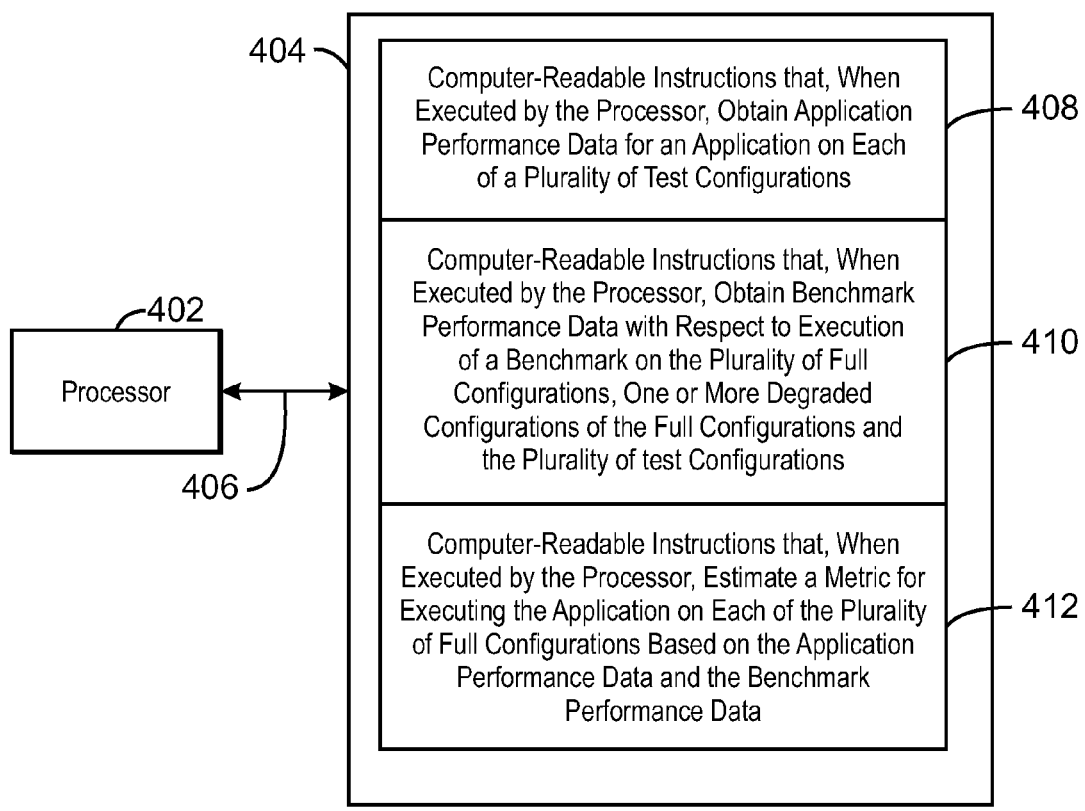
FIG. 4 is a block diagram showing a computer system that facilitates the selection of a full configuration of storage resources for an application according to an exemplary embodiment of the present invention.

FIG. 4 is a block diagram showing a computer system that facilitates the selection of a full configuration of storage resources for an application according to an exemplary embodiment of the present invention. The computer system is generally referred to by the reference number 400. The computer system 400 may be configured to perform estimation of metrics for executing an application on each of a plurality of full configurations of a storage system.

In the computer system 400, a processor 402 is configured to access a non-transitory, tangible, machine-readable medium 404 via a communication bus 406. The tangible, machine-readable medium 404 may correspond to any typical non-transitory storage device that stores computer-executed instructions, such as programming code or the like. As will be readily apparent to one of ordinary skill in the art, computer-executable instructions stored on the tangible, machine-readable medium 404 may be read and executed by the processor 402 via the communication bus 406.

A region 408 of the tangible, machine-readable medium 404 stores computer-readable instructions that, when executed by the processor 402, obtain application performance data for an application on each of a plurality of test configurations. A region 410 of the tangible, machine-readable medium 404 stores computer-readable instructions that, when executed by the processor, obtain benchmark performance data with respect to execution of a benchmark on a plurality of full configurations, one or more degraded configurations of the full configurations and the plurality of test configurations. A region 412 of the tangible, machine-readable medium 404 stores computer-readable instructions that, when executed by the processor, estimate a metric for executing the application on each of the plurality of full configurations based on the application performance data and the benchmark performance data. As explained herein, the metrics may be used to select the operational configuration for the application so that an agreed-upon service level may be achieved while optimizing the cost of providing the service level.

An exemplary embodiment of the present invention may provide certain advantages. For example, by evaluating the performance of an application on a small number of test configurations, an optimal full configuration may be identified by using a reasonable amount of time and effort. The benchmarking exercise need only be run once per potential full configuration. The computational effort required for fitting the models is relatively small, once the benchmarking measurements have been done. If additional potential full configurations are added later, they may be included in this method.

A special case occurs if all of the potential full configurations are considered to be test configurations. In such a case, an exemplary embodiment may predict the performance of the degraded modes of each configuration for an arbitrary given application, from benchmark tests on the same set of configurations and their degraded configurations.

What is claimed is:

1. A computer-implemented method for selecting from a plurality of full configurations of a storage system an operational configuration for executing an application, the method comprising:
   obtaining application performance data for the application on each of a plurality of test configurations;
   obtaining benchmark performance data with respect to execution of a benchmark on the plurality of full configurations, one or more degraded configurations of the full configurations and the plurality of test configurations;
   estimating a metric for executing the application on each of the plurality of full configurations based on the application performance data and the benchmark performance data; and
   selecting the operational configuration from among the plurality of full configurations based on the metric.

2. The computer-implemented method recited in claim 1, wherein the metric comprises at least one performance characteristic.

3. The computer-implemented method recited in claim 1, wherein the metric comprises at least one dependability characteristic.

4. The computer-implemented method recited in claim 1, wherein the metric comprises at least one performability characteristic.

5. The computer-implemented method recited in claim 1, wherein the metric relates to a desired service level.

6. The computer-implemented method recited in claim 1, wherein configuration options that define the plurality of full configurations comprise a number of separate copies or fragments into which a data object is split, a number of parities fragments stored at a local datacenter, a number of additional parity fragments stored at a remote data center, and/or a number of parities to be written before a data write is considered complete.

7. The computer-implemented method recited in claim 1, comprising:
   assigning a probability of occurrence for each of the degraded configurations; and
   taking into account the probability of occurrence for each of the degraded configurations when estimating the metric for executing the application on each of the plurality of full configurations.

8. The computer-implemented method recited in claim 1, wherein the application employs a Key-Binary Large Object (Blob) Archive.

9. A computer system for estimating metrics for executing an application on each of a plurality of full configurations of a storage system, the computer system comprising:
   a processor that is adapted to execute stored instructions; and
   a memory device that stores instructions, the memory device comprising stored instructions that, when executed by the processor, cause the processor to:
      obtain application performance data for the application on each of a plurality of test configurations;

obtain benchmark performance data with respect to execution of a benchmark on the plurality of full configurations, one or more degraded configurations of the full configurations and the plurality of test configurations; and estimate a metric for executing the application on each of the plurality of full configurations based on the application performance data and the benchmark performance data.

10. The computer system recited in claim 9, wherein the metric comprises at least one performance characteristic.

11. The computer system recited in claim 9, wherein the metric comprises at least one dependability characteristic.

12. The computer system recited in claim 9, wherein the metric comprises at least one performability characteristic.

13. The computer system recited in claim 9, wherein the metric relates to a desired service level.

14. The computer system recited in claim 9, wherein configuration options that define the plurality of full configurations comprise a number of separate copies or fragments into which a data object is split, a number of parities fragments stored at a local datacenter, a number of additional parity fragments stored at a remote data center, and/or a number of parities to be written before a data write is considered complete.

15. The computer system recited in claim 9, wherein the memory device comprises stored instructions that, when executed by the processor, cause the processor to:

assign a probability of occurrence for each of the degraded configurations; and take into account the probability of occurrence for each of the degraded configurations when estimating the metric for executing the application on each of the plurality of full configurations.

16. The computer system recited in claim 9, wherein the application employs a Key-Binary Large Object (Blob) Archive.

17. A non-transitory, computer-readable medium, comprising code configured to direct a processor to:

obtain application performance data for an application on each of a plurality of test configurations;

obtain benchmark performance data with respect to execution of a benchmark on a plurality of full configurations, one or more degraded configurations of the full configurations and the plurality of test configurations; and estimate a metric for executing the application on each of the plurality of full configurations based on the application performance data and the benchmark performance data.

18. The non-transitory, computer-readable medium recited in claim 17, wherein the metric comprises at least one performability characteristic.

19. The non-transitory, computer-readable medium recited in claim 17, wherein the metric relates to a desired service level.

20. The non-transitory, computer-readable medium recited in claim 17, comprising code to direct a processor to:

assign a probability of occurrence for each of the degraded configurations; and take into account the probability of occurrence for each of the degraded configurations when estimating the metric for executing the application on each of the plurality of full configurations.

* * * * *